June 7, 1960  R. L. SCHEIB  2,939,708
BARBED POINT FOR ARROWS
Filed July 31, 1957

BY *[signature]*
ATTORNEY

United States Patent Office 2,939,708
Patented June 7, 1960

---

2,939,708

BARBED POINT FOR ARROWS

Robert L. Scheib, 142 S. Bostwick St., Charlotte, Mich.

Filed July 31, 1957, Ser. No. 675,389

2 Claims. (Cl. 273—106.5)

The invention relates to barbed points for arrows or spears and particularly relates to a point wherein the barbs are retractable.

The large barbs necessary for use with arrows or spears employed in spear fishing and other sports wherein the point disengages from the shaft upon impact with the target are dangerous and troublesome when the points are being transported and carried about. It is, thus, an object of the invention to provide a barbed point for an arrow or spear wherein the barbs are retractable and may be rendered harmless and inoperative when desired.

Another object of the invention is to provide a retractable barbed point wherein the barbs may be folded within the body of the point.

A further object of the invention is to provide a retractable barbed point in which the barbs are capable of being locked in the retractable position yet may be quickly and easily released to assume the extended position.

Figure 1:
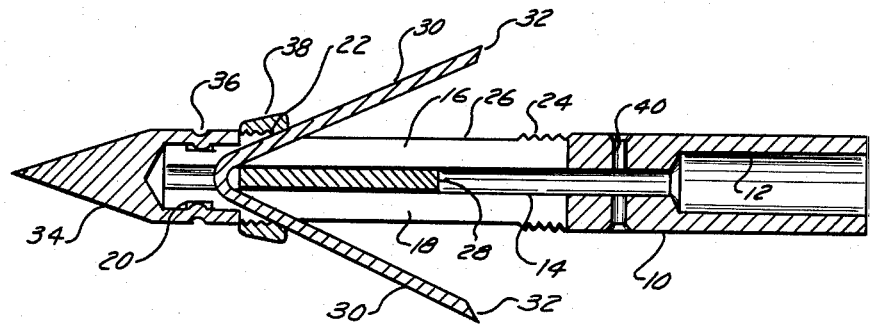
Figure 2:
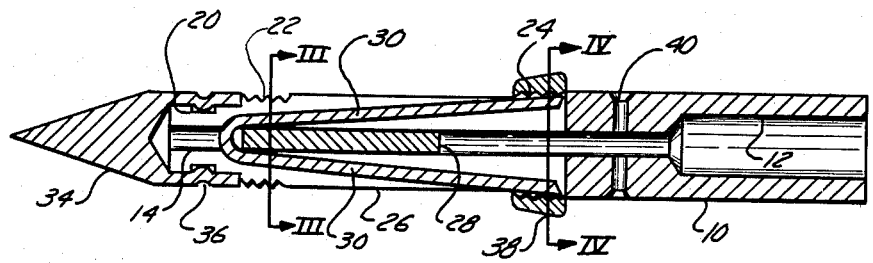
Figure 3:
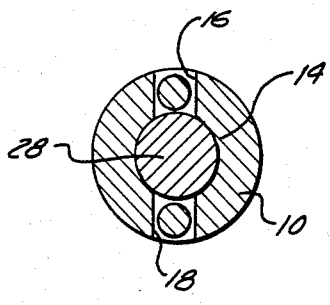
Figure 4:
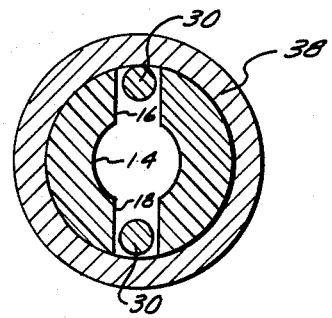

These and other objects of the invention will become apparent when viewed with regard to the following description and accompanying drawings, wherein:

Fig. 1 is a cross section elevational view of a point employing the concepts of the invention wherein the barbs are extended, Fig. 2 is a cross section elevational view of a barbed point with the barbs retracted into the shank of the point, Fig. 3 is a cross section taken along the line III—III of Fig. 2, and Fig. 4 is a cross section taken along the line IV—IV of Fig. 2.

The point illustrated may be used in any application wherein a large barbed point is advantageous and is especially useful, though not limited, with fishing arrows and spears. As seen in Fig. 1, the point consists of a substantially cylindrical shank or body 10 which is axially recessed at one end, as at 12, for attachment of the point to the arrow or spear shaft, not shown.

The point shank is provided with a concentric axial bore 14 extending from the left end, Figs. 1 and 2, to the large recess 12. A pair of diametrically opposite slots 16 and 18 radially formed in shank 10 intersect the bore 14 providing the clearance for the barb in the retracted position, as will later be apparent. The shank 10 is also formed with the circumferential groove 20 adjacent the forward end and a pair of annular threaded portions 22 and 24 axially spaced along the shank 10. It will be observed that the diameter of the shank of the portion 26 between the threads 22 and 24 is less than the diameter of the threads themselves.

A cylindrical plug 28 is fitted within bore 14 and performs a dual function in preventing the slotted portion of shank 10 from collapsing and also acts as the pivot about which the barb 30 retracts. The barb 30 is constructed of spring wire of circular cross section, bent in the center forming a pair of beveled ends 32. The center of the barb 30 contacts the end of plug 28 and the diameter of the barb is slightly less than the width of slots 16 and 18 whereby the barbs may project from the slots yet will not rotate appreciably with respect to shank 10.

A recessed tapered tip 34 is fitted over the slotted end of shank 10 and circumferentially recessed at 36 which forms the tip into groove 20 firmly inter-connecting the tip 34 and shank 10.

Operation of the barb 30 is by the internally threaded collar 38 which is preferably knurled on the outer circumference to facilitate rotation and may be selectively threaded in either threads 22 or 24. Thus, when the collar 38 is screwed on threads 22 the resilient nature of barbs 30 will extend the ends 32 from the shank body 10 as shown in Fig. 1, and in this position the barbs will hold the point in the target. Unscrewing collar 38 and sliding the collar along the portion 26 of the shank will progressively depress the barb 30 folding the same about plug 28 into slots 16 and 18. The collar 38 will encounter threads 24 and may be screwed thereon locking the barb 30 and barb ends 32 entirely within the slots as in Fig. 2 rendering the barbs safe and ineffective.

The point described above may be economically manufactured yet is strong and durable, able to withstand the shocks and impacts which will be imposed upon it. The barbs 30 extend from the shank 10 a sufficient amount to permit the point to be used with a detachable arrow or spear shaft, if desired, and the line may be attached to the point through the drilled hole 40. Operation of collar 38 is positive, quickly accomplished and will not permit the barbs to open accidently.

The invention is not intended to be limited to the specific construction of the illustrated embodiment as it will be understood that various modifications may be apparent without departing from the spirit and scope of the invention.

I claim:

1. A point for arrows or the like comprising an elongated shank, an axial recess formed in one end of said shank, a sharpened point attached to the other end of said shank, an axial bore extending the length of said shank, a pair of diametrically opposed radial slots formed in said shank intersecting said bore and the periphery of said shank, barbs carried within said slots and extendable therefrom, threads formed on the periphery of said shank adjacent said slots and an annular internally threaded collar engaging said threads adapted to retract said barbs within said slots.

2. A point for arrows or the like as recited in claim 1 wherein said threads formed in said shank consist of two sets of threads axially spaced on said shank.

References Cited in the file of this patent

UNITED STATES PATENTS

| 211,778 | Pierce | Jan. 28, 1879 |
| 1,133,189 | Shannon | Mar. 23, 1915 |
| 1,913,810 | Lannes | June 13, 1933 |
| 2,135,414 | Shores | Nov. 1, 1938 |
| 2,725,656 | Schmidt | Dec. 6, 1955 |
| 2,806,317 | Minisini | Sept. 17, 1957 |